(12) United States Patent
Xu et al.

(10) Patent No.: US 12,167,185 B1
(45) Date of Patent: *Dec. 10, 2024

(54) ULTRA-WIDEBAND WIRELESS PHOTONIC INTEGRATED ANTENNA SYSTEM

(71) Applicant: CABLE TELEVISION LABORATORIES, INC., Louisville, CO (US)

(72) Inventors: Mu Xu, Broomfield, CO (US); Luis Alberto Campos, Superior, CO (US); Zhensheng Jia, Superior, CO (US); Lin Cheng, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,147

(22) Filed: Jan. 23, 2023

Related U.S. Application Data

(63) Continuation of application No. 17/336,110, filed on Jun. 1, 2021, now Pat. No. 11,564,020.

(60) Provisional application No. 63/032,967, filed on Jun. 1, 2020.

(51) Int. Cl.
*H01Q 3/26* (2006.01)
*H01Q 3/34* (2006.01)
(Continued)

(52) U.S. Cl.
CPC ....... *H04Q 11/0005* (2013.01); *H01Q 3/2676* (2013.01); *H01Q 3/34* (2013.01);
(Continued)

(58) Field of Classification Search
CPC .......... H04Q 11/0005; H01Q 3/2676
See application file for complete search history.

(56) References Cited

U.S. PATENT DOCUMENTS

| | | | |
|---|---|---|---|
| 7,084,811 B1 * | 8/2006 | Yap ...................... | H01Q 3/2676 |
| | | | 342/373 |
| 11,564,020 B1 * | 1/2023 | Xu ....................... | H01Q 25/008 |

(Continued)

OTHER PUBLICATIONS

Attaran et al., "60 GHz low phase error Rotman lens combined with wideband microstrip antenna array using LTCC technology", IEEE Transactions on Antennas and Propagation, vol. 64, No. 12, Dec. 2016 (Year: 2016).*

(Continued)

*Primary Examiner* — Shi K Li
(74) *Attorney, Agent, or Firm* — Cozen O'Connor

(57) ABSTRACT

A radio frequency (RF) beam transmission component having optical inputs and electrical outputs may include a wavelength selective switch (WSS) that has a plurality of optical WSS outputs. Each optical WSS output may be configured to transmit one or more wavelengths of the incoming optical signals. The RF beam transmission component may include a plurality of photodetectors (PD), each photodetector having an optical PD input coupled to one or more of said plurality of optical WSS outputs and a corresponding electrical output of a plurality of PD electrical outputs. The RF beam transmission component may further include a lens that has a plurality of electrical inputs and each electrical input may be electrically coupled to at least one of the plurality of electrical PD outputs. The lens may further have a plurality of electrical lens output ports.

19 Claims, 13 Drawing Sheets

(51) Int. Cl.
  *H04B 10/11*   (2013.01)
  *H04B 10/25*   (2013.01)
  *H04J 14/02*   (2006.01)
  *H04Q 11/00*   (2006.01)
  *H01Q 5/25*    (2015.01)

(52) U.S. Cl.
  CPC ............ *H04B 10/11* (2013.01); *H04B 10/25* (2013.01); *H04J 14/0212* (2013.01); *H01Q 5/25* (2015.01); *H04Q 2011/0016* (2013.01); *H04Q 2011/0035* (2013.01); *H04Q 2011/0039* (2013.01); *H04Q 2011/0041* (2013.01)

(56)        References Cited

U.S. PATENT DOCUMENTS

| | | | |
|---|---|---|---|
| 2018/0198551 A1* | 7/2018 | Cavaliere | H04B 10/80 |
| 2021/0176543 A1* | 6/2021 | Bakopoulos | H04Q 11/0066 |
| 2022/0029710 A1 | 1/2022 | Zwet et al. | |

OTHER PUBLICATIONS

Darvazehban et al., "Ultra-Wideband Scanning Antenna Array with Rotman Lens," IEEE Transactions on Microwave Theory and Techniques, vol. 65, No. 9, Sep. 2017 (Year: 2017).
Lucyszyn et al., RF MEMS for Antenna Applications, 7th EUCAP, IEEE, 2013 (Year: 2013).

\* cited by examiner

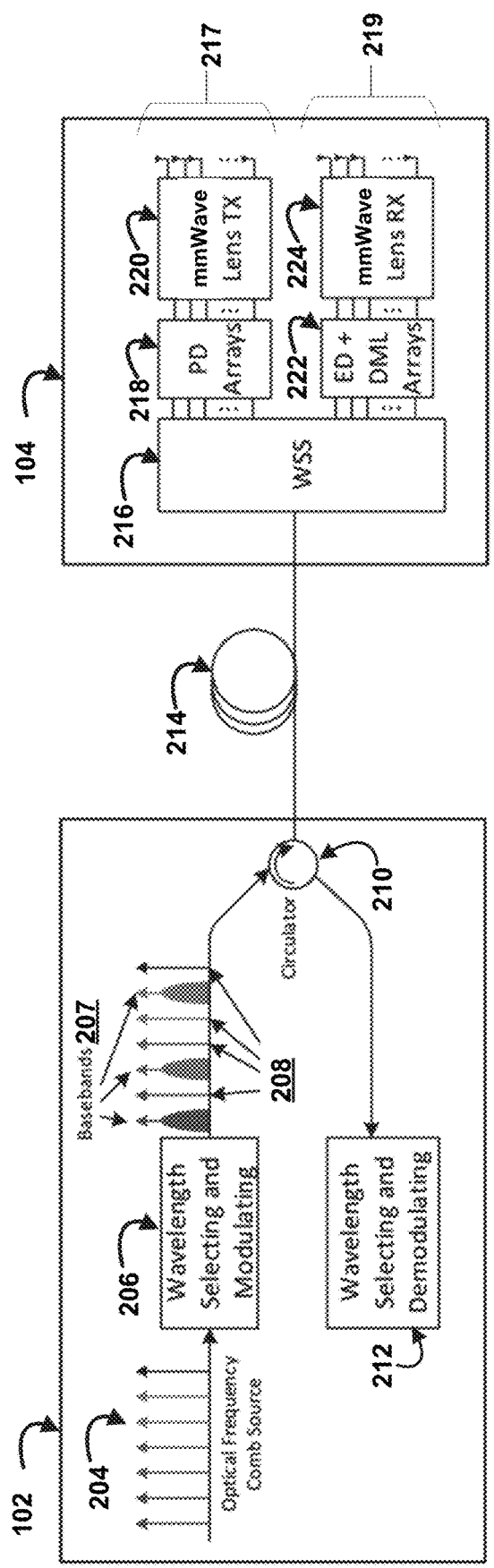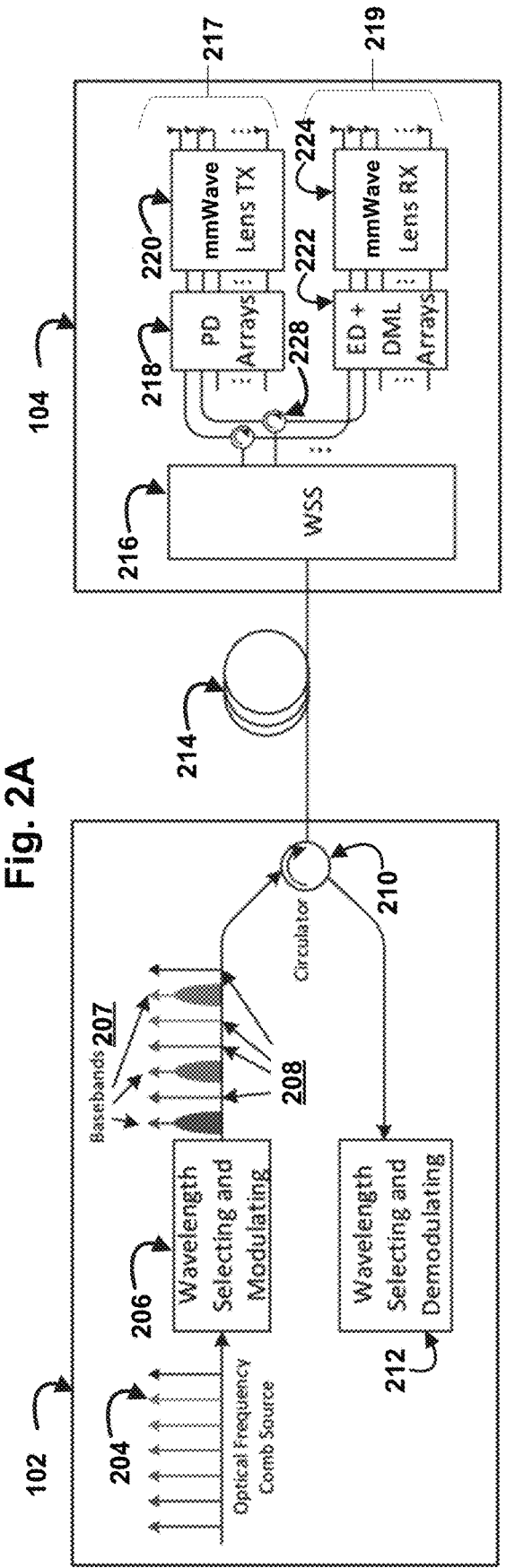
Fig. 2A
Fig. 2B

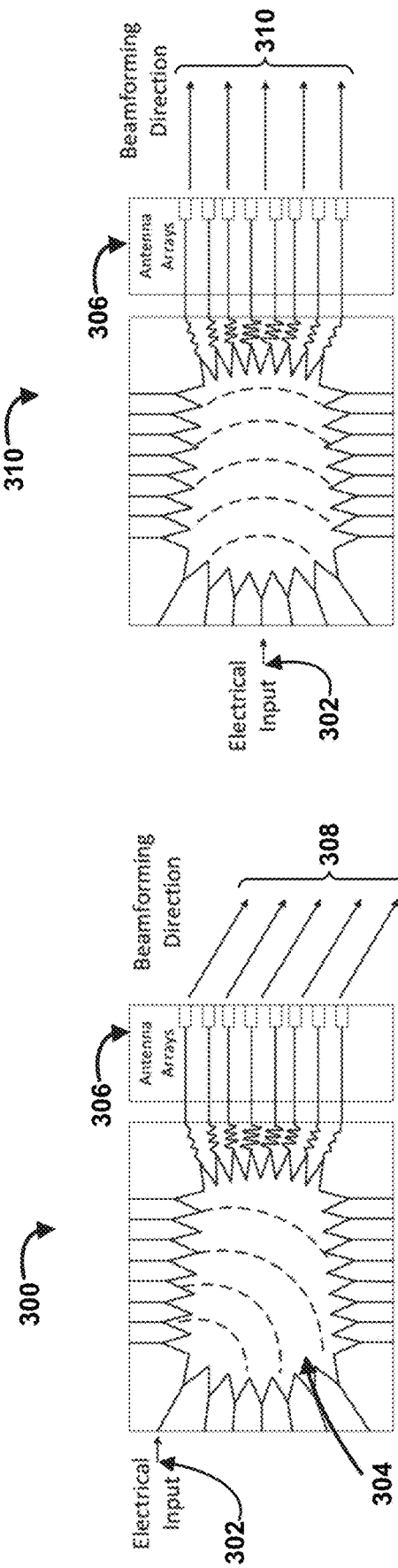
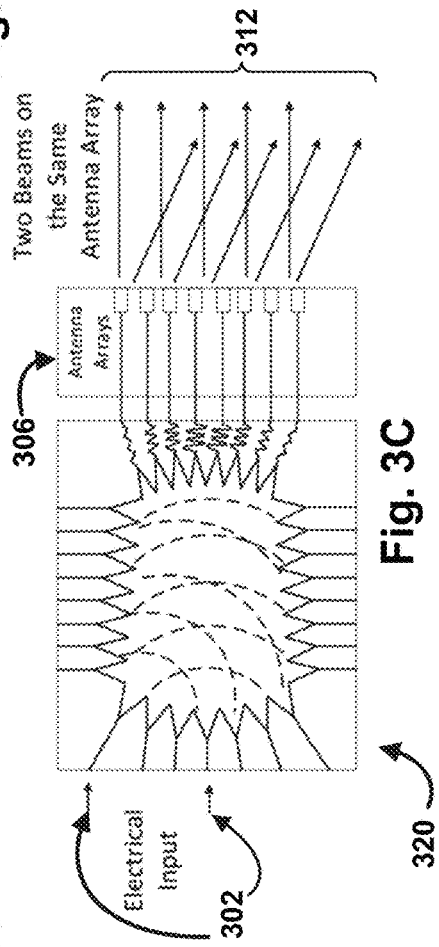

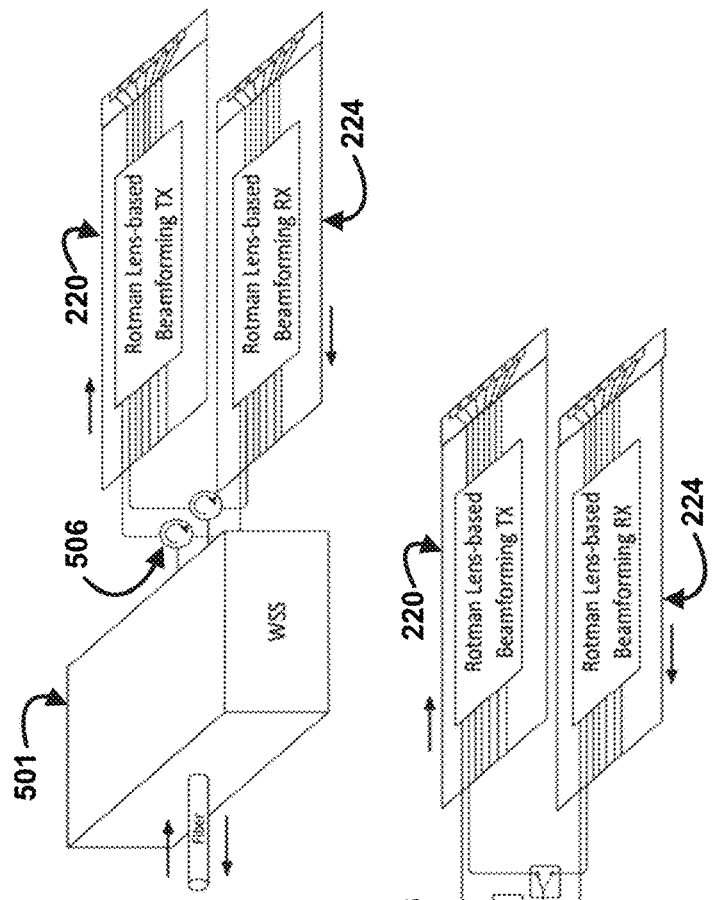
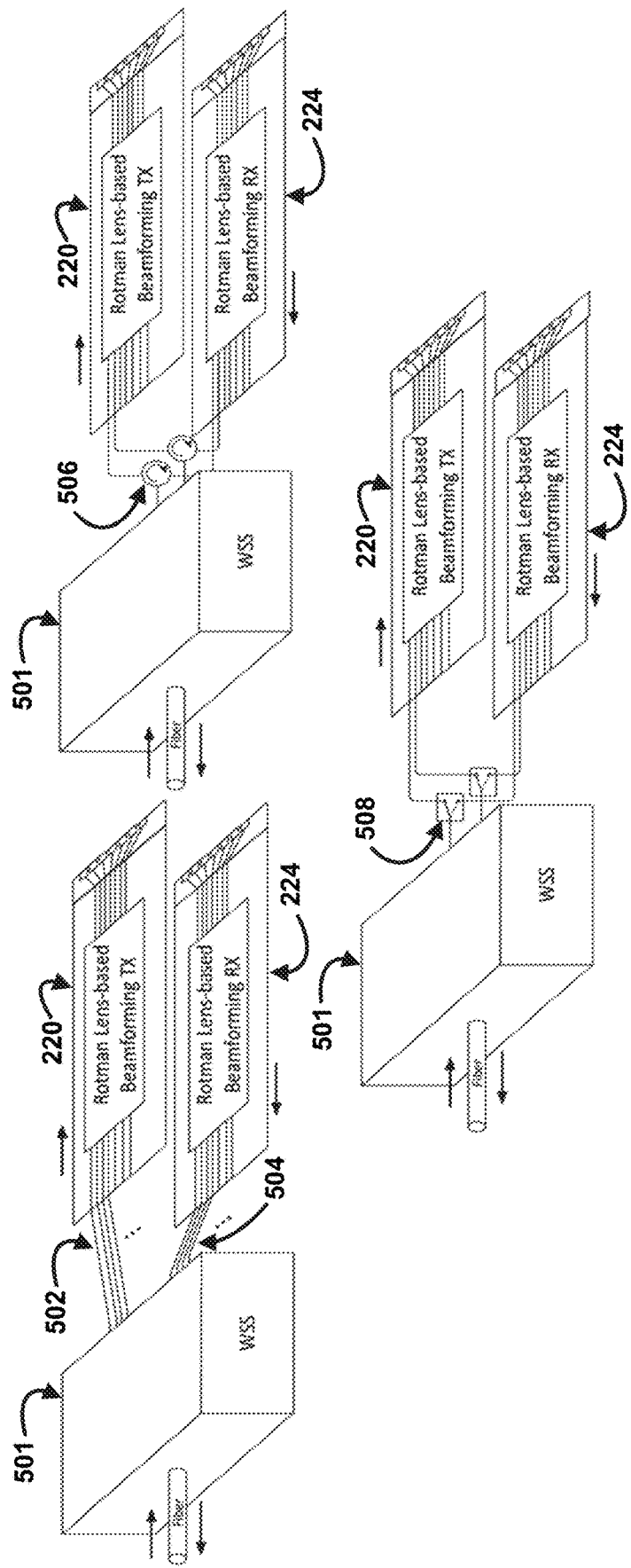
Fig. 5A
Fig. 5B
Fig. 5C

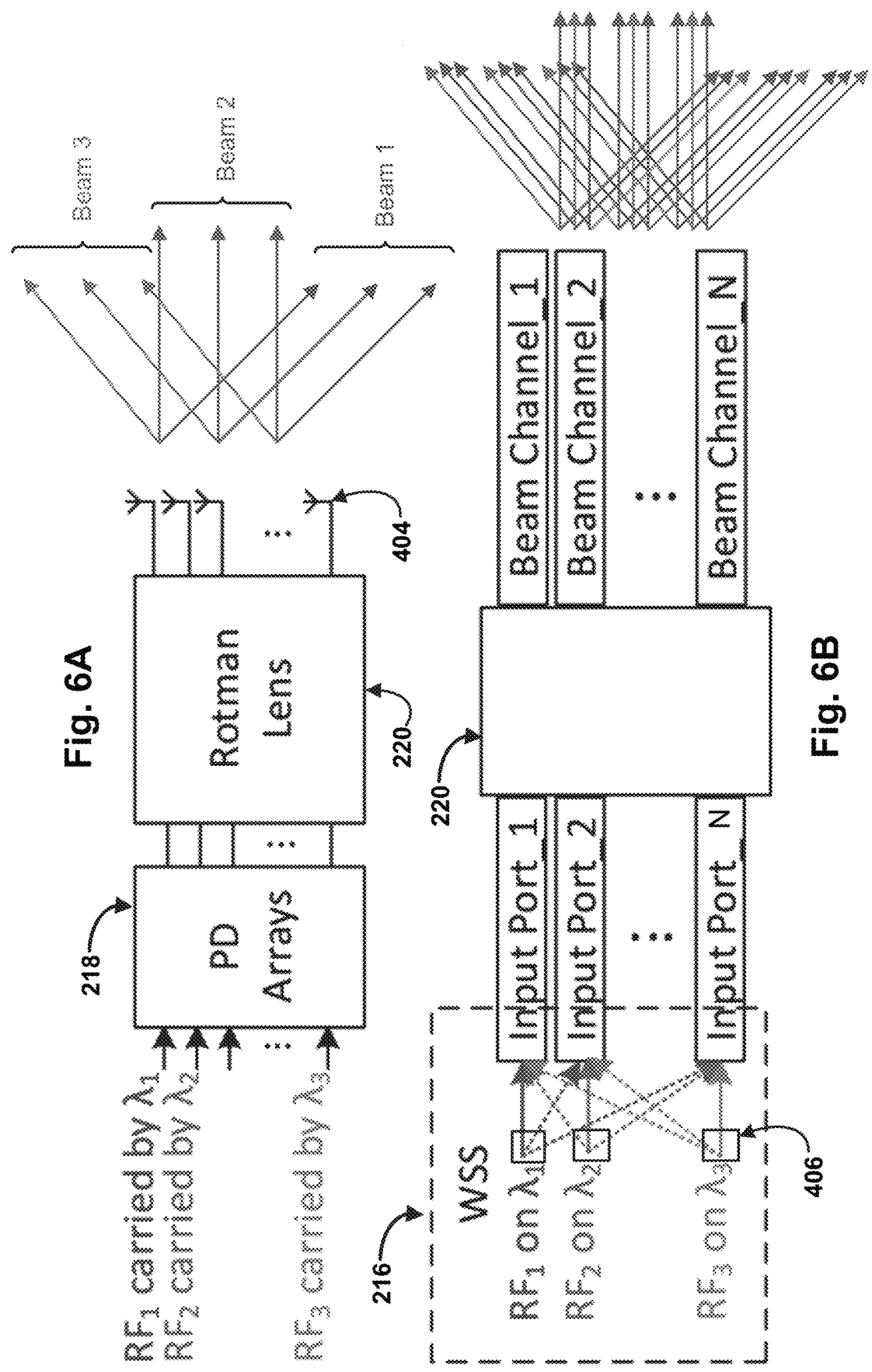

ULTRA-WIDEBAND WIRELESS PHOTONIC INTEGRATED ANTENNA SYSTEM

RELATED APPLICATIONS

This application is a continuation of U.S. patent application Ser. No. 17/336,110, filed Jun. 1, 2021, which claims priority to U.S. Patent Application Ser. No. 63/032,967, titled "AN ULTRA-WIDEBAND WIRELESS PHOTONIC INTEGRATED ANTENNA SYSTEM", filed Jun. 1, 2020. Each of the above referenced applications is incorporated herein by reference in its entirety.

BACKGROUND

Telecommunications is the transmission and reception of data between devices, such as an antenna system or user equipment, over a host of electromagnetic systems, including wire, optical, radio, etc. Downlink data transmission sends information from an antenna system to user equipment and uplink data transmission sends information from user equipment to an antenna system. Antenna systems may transmit and receive data from user equipment on various channels, frequency ranges. In telecommunication, 5G is the fifth-generation standard for cellular communications and will replace 4G networks, the current standard.

SUMMARY OF THE INVENTION

In some implementations, a radio frequency (RF) beam transmission component having optical inputs and electrical outputs may include a wavelength selective switch (WSS) that has a plurality of optical WSS outputs. Each optical WSS output may be configured to transmit one or more wavelengths of the incoming optical signals. The RF beam transmission component may include a plurality of photodetectors (PD), each photodetector having an optical PD input coupled to one or more of said plurality of optical WSS outputs and a corresponding electrical output of a plurality of PD electrical outputs. The RF beam transmission component may further include a lens that has a plurality of electrical inputs and each electrical input may be electrically coupled to at least one of the plurality of electrical PD outputs. The lens may further have a plurality of electrical lens output ports.

In some implementations, an antenna may include an antenna array. Each antenna of the antenna array may be configured to receive one or more wavelengths of the electrical signals from user equipment. The antenna may include a lens that has a plurality of electrical inputs, each electrical input configured for being electrically coupled to at least one antenna of the antenna array. The lens may further include a plurality of electrical lens output ports. The antenna may further include an envelope detector (ED) that has a plurality of electrical ED input ports coupled to a corresponding RL output port of the plurality of electrical lens output ports. The antenna may further include a plurality of electrical ED output ports. The antenna may further include a demodulated laser (DML) that has a plurality of electrical DML inputs, each electrical DML input being electrically coupled to the plurality of ED output ports. The DML may further include a plurality of optical DML outputs. The antenna may further include a wavelength selection switch (WSS) that has a plurality of optical WSS inputs, each optical WSS input electrically may be coupled to an optical DML output of the plurality of optical DML outputs.

In some implementations, a method may include identifying a location and speed of an external device. The method may further include identifying a channel for a beam configuration to deliver data to the external device. The method may further include generating a signal pair including a local oscillator and a base band signal, using a frequency comb. The method may further include modulating the base band signal to include desired data carried by the channel. The method may further include controlling the MCS to select photo detectors to receive the local oscillator and the base band signal based on the location and speed.

BRIEF DESCRIPTION OF THE FIGURES

FIG. 2A shows one example system of an optical base station coupled with an optical-electrical antenna via a fiber optic cable, according to an embodiment.

FIG. 2B shows one example system of an optical base station coupled with an optical-electrical antenna via a fiber optic cable, according to an embodiment.

FIG. 3A shows one example Rotman lens and antenna array system, with an outgoing beam in a downward direction, according to an embodiment.

FIG. 3B shows one example Rotman lens and antenna array system, with an outgoing beam in a direction, according to an embodiment.

FIG. 3C shows one example Rotman lens and antenna array system with two outgoing beams, according to an embodiment.

FIG. 5A shows one example optical-electrical antenna system that includes a wavelength selection switch coupled via a plurality of channels to both a first Rotman lens for transmitting downlink data and a second Rotman Lens for receiving uplink data, according to an embodiment.

FIG. 5B shows one example optical-electrical antenna system that includes a wavelength selection switch coupled via an optical circulator to both a first Rotman lens for transmitting downlink data and a second Rotman Lens for receiving uplink data, according to an embodiment.

FIG. 5C shows one example optical-electrical antenna system that includes a wavelength selection switch coupled via a first switch to both a first Rotman lens for transmitting downlink data and to a second switch to a second Rotman Lens for receiving uplink data, according to an embodiment.

FIG. 6A shows an example antenna system for downlink transmission, outputting one or more frequencies, from an antenna array, in a particular direction, according to an embodiment.

FIG. 6B shows an example antenna system for downlink transmission, outputting one or more frequencies that have been broadcasted, by an optical multi-cast switch, to each input port of a Rotman lens, according to an embodiment.

DETAILED DESCRIPTION OF THE EMBODIMENTS

Figure 1:
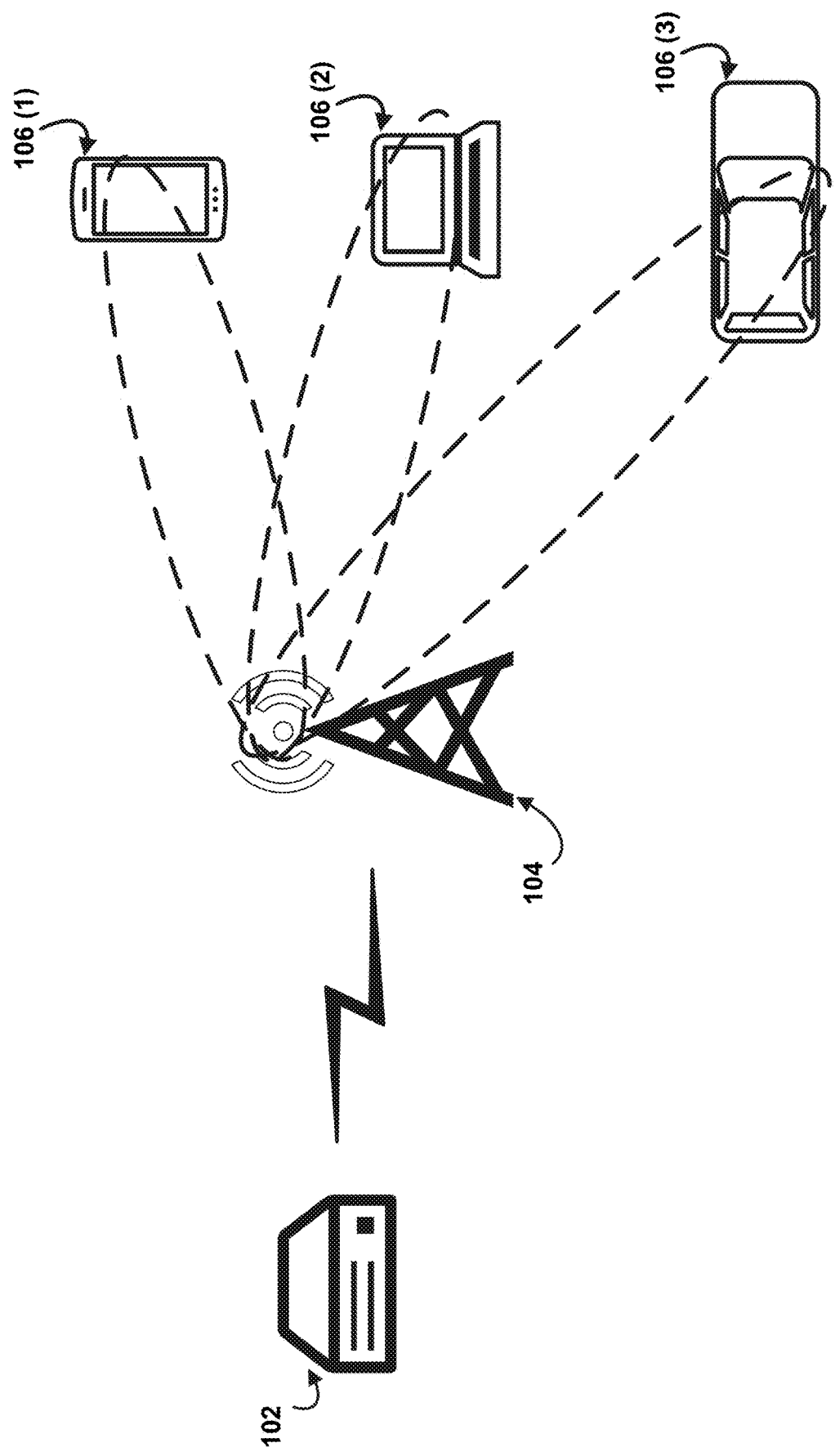
FIG. 1 shows one example optical-electrical data transmission system including an optical base station, an optical-electrical conversion antenna, and one or more user equipment, according to an embodiment.

Following the continuous demands on high speed and convenient mobile data access, current long-term evolution (LTE) is firmly and quickly evolving to 5G wireless technology. To be compatible with newly released bands from sub-6 GHz to millimeter wave, one of the key enablers is an ultra-broadband antenna system which may increase the wireless throughput in the long term and reduce the cost to support the coexistence of multiple bands. In the U.S. mobile market, new wireless opportunities for cable operators are arising as the Federal Communications Commission (FCC) is firmly releasing new spectrums, including 3.5 GHz, 3.7-4.2 GHz, 6 GHz, and multiple millimeter-wave bands (e.g., 24, 28, 37, and 39 GHz). However, the more bands we have, the more complicated a base station may become. The traditional scheme for a set of dedicated systems for each frequency carrier is not a sustainable approach.

Embodiments of the present disclosure include addressing this issue via a wireless photonic integrated solution to support beamforming of multiple radio-frequency bands simultaneously. Further, embodiments of the present disclosure may address current millimeter-wave technology issues, such as efficient true-time delay-line, with an equal time delay, in a broad operation frequency range. Another issue embodiments of the present disclosure addresses includes bandwidth limited devices. The desirable response bandwidth of the commercial phase shifter arrays today is typically limited to hundreds of megahertz. Moreover, because of fabrication deficiencies, split imbalance, phase mismatches, and skews in a large network of phase shifters and splitters, the performance and response bandwidth of beamforming antenna systems are also greatly degraded, especially when they are expanded to support more-than 64 antenna elements.

Moreover, embodiments of the present disclosure address the high expenditure for beamforming phase array. A tremendously increased cost is incurred when multiple beams need to be generated simultaneously in point-to-multi-point wireless communications between one base station and multiple mobile users. In 5G, up to 32 beam sectors have been defined in the latest specification. Supposing one beam requires at least an antenna array with four-by-four elements, to support 32 beams, an antenna array with 512 elements is needed resulting in a high cost. However, if there exists an antenna design to enable multiple beams sharing the same antenna array, for example, if one four-by-four antenna array can generate 8 independent beams at the same time, then the total number of antenna elements could be reduced to 64, greatly reducing expected cost.

Further, embodiments of the present disclosure include a photonic-electrical integrated antenna system for ultra-wide-band radio frequency (RF) beamforming and related technologies to support the functioning of the antenna system. The antenna system may be based on a wavelength selection switch (WSS)-based optical-switching network coupled to a millimeter wave or microwave lens (such as a Rotman lens). Compared with traditional beamforming phase array, the proposed scheme is featured by centralized control, lower complexity, true-time delay, reduced insertion loss, and larger operation bandwidth. The present disclosure shows the capability to support multiple carriers across a large frequency range, thus simplifying the wireless system with multi-frequency coexistence. More importantly, by utilizing the reconfigurable wavelength switching from WSS, multiple beams can be radiated and steered independently, which facilitates multi-beam coexisting over the same antenna setup, thus greatly reducing the cost of the beamforming systems. Other aspects like the controlling of the beams and the optical mobile fronthaul architecture to support the antenna system are also discussed in the present disclosure.

FIG. 1 shows an optical signal source 102 that may be in wireless communication with an antenna system 104. The optical signal source 102 is, for example, a central office as understood in the 5G architecture. The optical signal source 102 may transmit and receive wavelengths in the form of light, to and from, the antenna system 104. The antenna system 104 is a base station, for example, as known in the 5G architecture. The antenna system 104 may then convert the received light to an electrical signal and then output the electrical signal to one or more user equipment 106(1)-(3). Further, the antenna system 104 may receive electrical signals from the one or more remote devices 106(1)-(3), and then convert the electrical signals to light. Remote devices 106(1)-(3) may include any user equipment as understood in the 5G architecture, or other devices within a wireless communication protocol which communicate with the antenna system on an RF carrier. The antenna system 104 then transmits the light to the base station 102. In some embodiments, the optical signal source 102 and the antenna system 104 may be housed within the same compartment.

The architecture shown in FIG. 1 applies to a 5G architecture. However, it should be appreciated that the architecture may be implemented in other wireless communication protocols without departing from the scope hereof.

FIG. 2A shows various components of the optical signal source 102 and the antenna system 104, with reference to FIG. 1. The optical signal source 102 may include an optical source 204 (e.g., hereinafter referred to as an "optical frequency comb source") capable of generating light of varying frequency ranges per channel. A wavelength selecting and modulating component 206 receives the light from the optical frequency comb source 204 and outputs one or more baseband signals 207 and local oscillator signals (LO) 208. The one or more baseband signals 207 may include information and the accompanying LO signal 208 may correspond to one or more of the baseband signals 207. A width of the baseband signal 207 may correspond to the bandwidth of the output RF channel. Accordingly, each local oscillator and corresponding baseband signal 207 may form a signal pair, wherein each signal pair, after analysis downstream corresponds to an output RF signal channel (e.g., channels 910 and 912 of FIG. 9, discussed below) from an antenna array. Each signal pair (e.g., one LO signal 208 and an "attached" (or corresponding) baseband signal 207 is transmitted from the optical signal source 102 to an antenna system 104. In one example, the optical signal source 102 includes an optical switch 210. The optical switch 210 may be an optical circulator 210, or another type of optical switch such as an optical transceiver switch.

The output light from the optical switch 210 is then propagated to an antenna device 104 via an optical fiber 214. The light propagated on the optical fiber 214 is received by the antenna system 104, and analyzed by a wavelength selection switch (WSS) 216 of the antenna system 104. Antenna system 104 in FIGS. 2A and 2B are shown having a downlink portion 217, and an uplink portion 219. The downlink portion 217 of the antenna system 104 handles communications from the antenna system 104 to the external device 106. The uplink portion 219 handles communications from the external device 106 to the antenna system 104. The downlink portion 217 and uplink portion 219 are shown sharing a WSS 216. However, in embodiments, the downlink portion 217 and uplink portion 219 may have dedicated WSSs 216 that are each coupled to the optical fiber 214.

In a downlink transmission, where the optical switch 210 is an optical circulator, the optical circulator may passively transmit the signal pairs of basebands 207 and local oscillators 208 from the optical signal source 102 to the antenna system 104. In the uplink transmission, where the optical switch 210 is an optical circulator, the optical circulator may passively transmit the light from the WSS 216 corresponding to uplink data to a wavelength selector and demodulator 212.

In the downlink transmission, after transmitting through the fiber, the optical signals are received at WSS 216, and then the WSS 216 may demultiplex different wavelengths of the baseband signals 207 and the corresponding LO 208, through a plurality of optical outputs of the WSS 216. The demultiplexed signal pairs of the baseband signals 207 and the corresponding LO 208 output from the WSS 216 are received by an optical input of a photo detector (PD) 218. The photo detector 218 may convert the optical signals, to electrical signals. The electrical signals may be transmitted to a corresponding input of a plurality of electrical inputs of a millimeter wave (mmWave) or microwave lens transmitter 220. In one embodiment, the millimeter wave or microwave lens transmitter 220 is a Rotman Lens (RL), where each electrical input of the RL transmitter is coupled to at least one of the plurality of electrical PD 218 outputs. A plurality of electrical output ports (not shown in FIG. 2A) output the electrical signals through an antenna array to one or more user equipment (not shown). Herein, reference to a Rotman Lens includes other type of millimeter wave or microwave lenses, and vice versa, unless otherwise specified.

In the uplink portion 219, the antenna system may further include a millimeter wave (mmWave) or microwave lens receiver 224 that is coupled to an antenna array, where each antenna element of the antenna array is configured to receive one or more electrical signals from one or more user equipment (not shown). In one embodiment, the millimeter wave or microwave lens receiver 224 is a Rotman Lens (RL). The antenna array coupled to the transmitter 220 and the antenna array coupled to the receiver 224 may be the same antenna array, or may be separate antenna arrays without departing from the scope hereof. The electrical signals received by antenna elements are transmitted to a plurality of input ports of receiver 224, where each input port is electrically coupled to at least one antenna element of the antenna array. The electrical may be down converted to a baseband signal through an envelope detector (ED) that has a plurality of electrical ED input ports coupled to a corresponding RL output port of a plurality of electrical RL receiver output ports.

A plurality of electrical ED output ports may transmit the baseband signals to a plurality of electrical demodulated lasers (DMLs) inputs, each electrical DML input being electrically coupled to the plurality of ED output ports. The electrical signals received by the DML are modulated onto the light via the DMLs. The combination of the ED and the DML may be the ED+DML array 222. Then, the light is outputted by a plurality of optical DML outputs, according to a wavelength, through an optical path to the WSS 216, via a plurality of optical WSS inputs, each optical WSS input electrically coupled to an optical DML output of the plurality of optical DML outputs. The WSS 216 may then send the light though the fiber optic cable 214, where different wavelengths of light are passively routed by the optical circulator 210, and then demultiplexed and, baseband signals carried by the light, are demodulated by the wavelength selector and demodulator 212. In some embodiments, there may not be a fiber optic cable 214 and the WSS 216 and the optical signal source may wirelessly communicate via free-space optical communication and the optical circulator 210 may transmit and receive optical signals to and from the WSS 216. And similarly, the WSS 216 may transmit and receive optical signals to and from the optical circulator 210. In some embodiments, different wavelength channels for the outputted light, from the WSS 216 to the PD arrays 218, and the incoming light, from the ED+DML array 222 to the WSS 216, may be used. However, in some embodiments, an optical circulator 228 to full-duplex both the incoming light to the WSS 216 and the outgoing light from the WSS 216, through one wavelength, may be used, as shown in FIG. 2B.

FIG. 2B shows an embodiment of the antenna system 104, where incoming and outgoing light may be duplexed through an optical circulator 228 located between the WSS 216 and the downlink portion 217 and uplink portion 219. The components of the optical signal source 102 are not changed between FIGS. 2A and 2B. With regards to the antenna system 104, the downlink portion 217 and uplink portion 219 may share ports of the WSS 216 via the optical circulator 228 (or a plurality thereof).

Turning now to FIG. 3A, an example structure of a Rotman lens-based antenna system 300 is shown. Rotman lens-based antenna system 300 is an example of the transmitter 220 and receiver 224 of FIGS. 2A-B. A Rotman lens-based antenna system 300 may simplify a traditional antenna architecture and may support multiple beams simultaneously, e.g., beams 308. A Rotman lens 300 may include a free-space electro-magnetic (EM) wave oscillator cavity 304 that propagates an electrical input 302 to an antenna array 306. The Rotman lens 300 may be composed of a conducting plate with arrays of spikes along the beam contours at the input plane, output front, and two side edges. An array of transmission lines marks the input ports of the Rotman lens 300. At the output side, a group of phase-matched transmission lines connect the cavity 308 of the Rotman lens to outer phase antenna arrays 306. There may grounded ribs as dummy ports distributed along the two side edges of the Rotman lens 300 (the top and bottom spikes), to prevent undesired millimeter-wave (MMW) signal leakage out of the cavity.

The input and output ports may be aligned at the focal surface of the microwave lens. When the MMW electrical signals 302 enter one input port, it will oscillate and interfere inside the cavity 304, which will produce a desirable amplitude and phase distribution at the output side for the antenna arrays 306 to radiate out a directional MMW beam to the air, destined for user equipment (not shown). The beam steering angle of the beam outputted from the antenna array 306 corresponds to the subtended beam port angle that receives the electrical input 302. For example, electrical input 302 inputted to the Rotman lens 300, will form a beam 308 that is outputted from the antenna array 306, in the same direction as when entering the Rotman lens 300. Thus, by switching the input ports of the MMW signal, different beam steering angles can be achieved at the output antenna arrays 306. For example, as shown in FIG. 3B, the electrical input 302 enters a middle section of the example Rotman lens 310, and the beam steering angle of the beam outputted from the antenna array 306 is equal to the entering electrical input 302 angle.

FIG. 3C shows a Rotman lens 320 supporting multiple beams by reusing the same antenna array 306. Different standing waves inside the cavity 308 can be stimulated and coexist at the same time, which may be the result from multiple electrical signals 302 entering into the Rotman lens 320 simultaneously through different input ports and thus independently forming multiple beams 312. All the while, the free-space microwave interferometer system can realize true-time delays along the EM wave propagation path, which can achieve an accurate wide-beam steering-angle over a broad-frequency bandwidth.

Proposed Beamforming Systems Enhanced by Photonic Switching

One of the issues in a Rotman lens based MMW antenna system is how to switch the input signals to different output ports efficiently with a low loss of information. Compared with traditional electronic switching systems, because of the availability of wavelength-division multiplexing (WDM) and wavelength switching, a photonics switch, using a photo detector such as that described herein, is more efficient than electrical switch in terms of operation bandwidth, flexibility, and insertion loss, especially for a large-scale switching-network. Embodiments of the present disclosure simplify the switching functions by utilizing optical signals as opposed to electrical signals. Incoming MMW optical signals are generated and transmitted to an antenna system, then converted to electrical signals, before being transmitted to a Rotman lens.

Figure 4A:
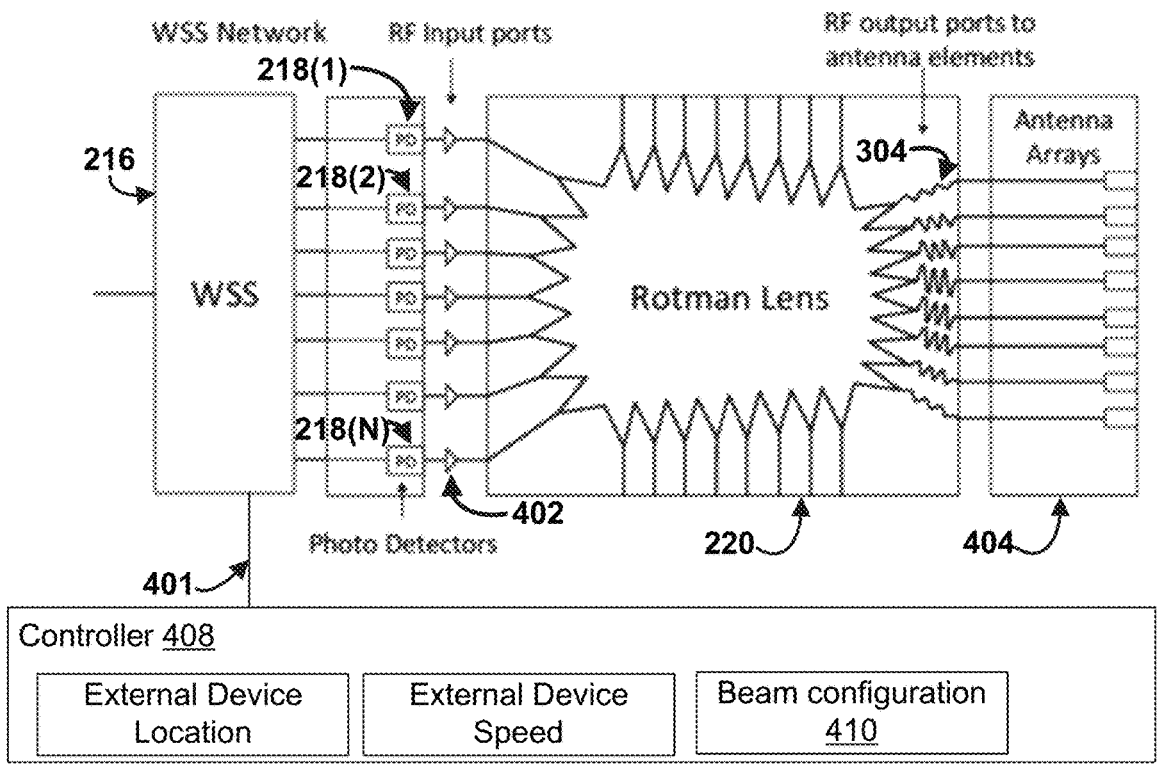
FIG. 4A shows one example optical-electrical antenna system for downlink data transmission that includes photo detectors, according to an embodiment.

FIG. 4A shows an example downlink portion 217 (with reference to FIG. 2) of the antenna system 104 of FIG. 1, in an embodiment. As shown in FIG. 4A, between the photonic part (i.e., the WSS 216) and electrical part (the RL transmitter 220), there is an array of photo detectors (PD) 218(1), (2), . . . , (N) (the photo detectors 218(1)-(N) have not all been listed in FIG. 4A for clarity; hereinafter, the individual photo detectors photo detectors 218(1)-(N) may be referred to as photo detector 218) that convert the optical signals outputted from the WSS 216 into electrical signals. Further, an array of amplifiers 402 could be used to boost the electrical signals, outputted by optical outputs of the PD 218, to electrical inputs of the RL transmitter 220. Upon exiting the output ports 304 of the RL transmitter 220, the beam output by the antenna array 404 is steered on the input port angle of the RL transmitter 220. Multiple wavelengths can be used to concurrently carry different MMW signals. For example, each output of the WSS 216 may be connected with one corresponding optical input of the PD 218.

Further, a control signal 401 may be generated by a controller 408 that controls the WSS 216 to control which optical signal (e.g., which signal pair of baseband 207 and local oscillator 208) is received at each photodetector 218. The controller 408 and control signal 401 may reside at the antenna system 104, or be a component of the optical signal source 102. The controller 408 includes data, such as the location of the external device and the speed of the external device, as shown in FIG. 4A. These data may be used by the controller 408 to determine the beam configuration 410 outputted by the antenna arrays 404, and which photo detectors 218 to select for the outputted beam configuration.

Figure 4B:
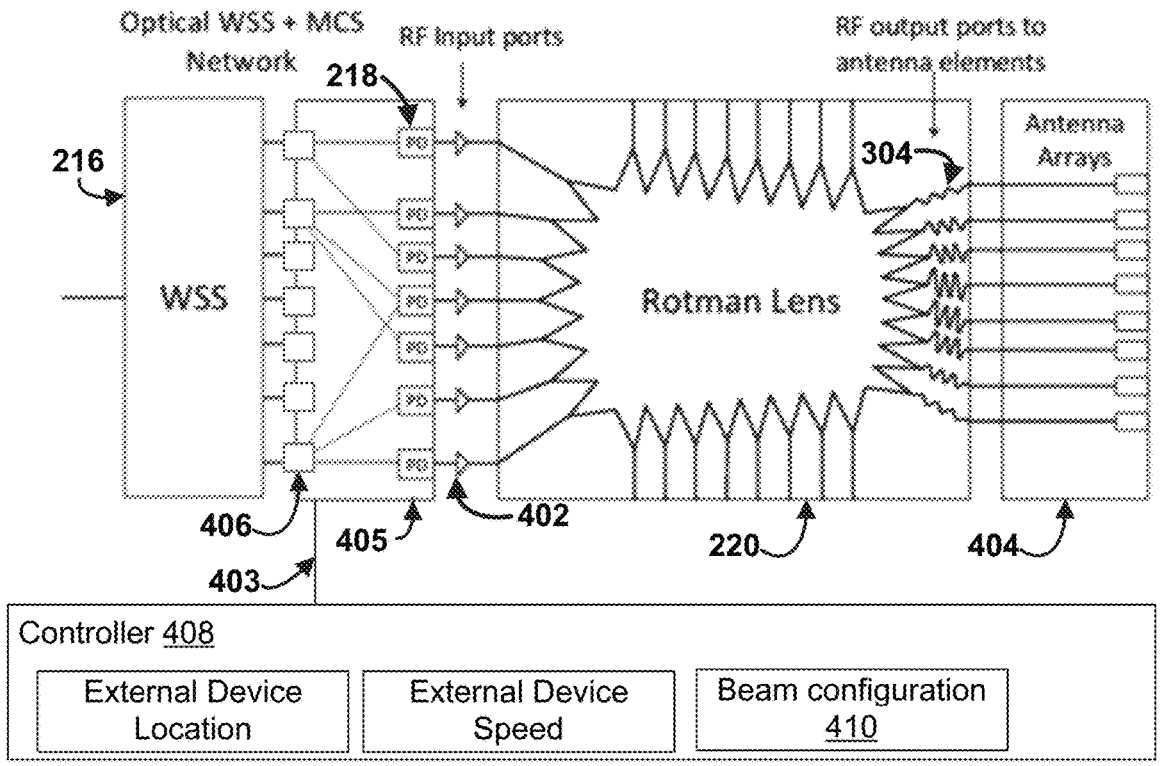
FIG. 4B shows one example optical-electrical antenna system for downlink data transmission that includes an optical multi-cast switch and photo detectors, according to an embodiment.

FIG. 4B shows an example downlink portion 217 of the antenna system 104 of FIG. 1, including an optical multi-cast switch (MCS) 406, in an embodiment. However, as shown in FIG. 4B, the WSS 216 optical outputs can be coupled to optical inputs of the MCS 406 to enable broadcast of one or more signal pairs of basebands 207 and local oscillators 208 to multiple ones of the PDs 218. For example, the top input received by the MCS 406 from the WSS 216 is broadcast to two different PDs 218. The second-from-the-top input received by the MCS from the WSS 216 is broadcast to three different PDs 218; and the bottom input received by the MCS 406 from the WSS 216 is broadcast to three different PDs 218. A single PD 218 may accept multiple optical signals with different wavelengths. Each input to the MSC 406 may be broadcast to any one or more of the PDs 218 depending on the control of the MCS 406. Therefore, a control signal 403 may be generated by a controller 408, in connection to a housing 405 of the MCS 406 and the PDs 218, that controls the MCS 406 (or the WSS 216) to control which optical signal (e.g., which signal pair of baseband 207 and local oscillator 208) is received at each photodetector 218. The controller 408 and control signal 403 may reside at the antenna system 104, or be a component of the optical signal source 102. The controller 408 includes data, such as the location of the external device and the speed of the external device, as shown in FIG. 4A. These data may be used by the controller 408 to determine the beam configuration 410 outputted by the antenna arrays 404, and which photo detectors 218 to select for the outputted beam configuration.

In addition, based on a silicon and complementary metal-oxide-semiconductor (CMOS) technology, the optical (e.g., WSS 216 and MCS 308) and electrical (e.g., PDs 302, RL transmitter 220, and antenna array 306) subsystems in the antenna system 104 can be compactly integrated into a single MMW photonic circuit for ease of a large-scale fabrication. For example, each of the components 216, 218, 220, 304, 402, 404, 406, 408, and 410 may be included within a same housing or otherwise on a same integrated circuit. In some embodiments, the MCS 406 may be integrated into the WSS 216 or within a same housing as the PD 218, or as a stand-alone component. FIG. 4B further shows an array of amplifiers 402, leading to electrical inputs of the RL transmitter 220, for output by the RL electrical output ports 304, to the antenna array 404.

Figure 4C:
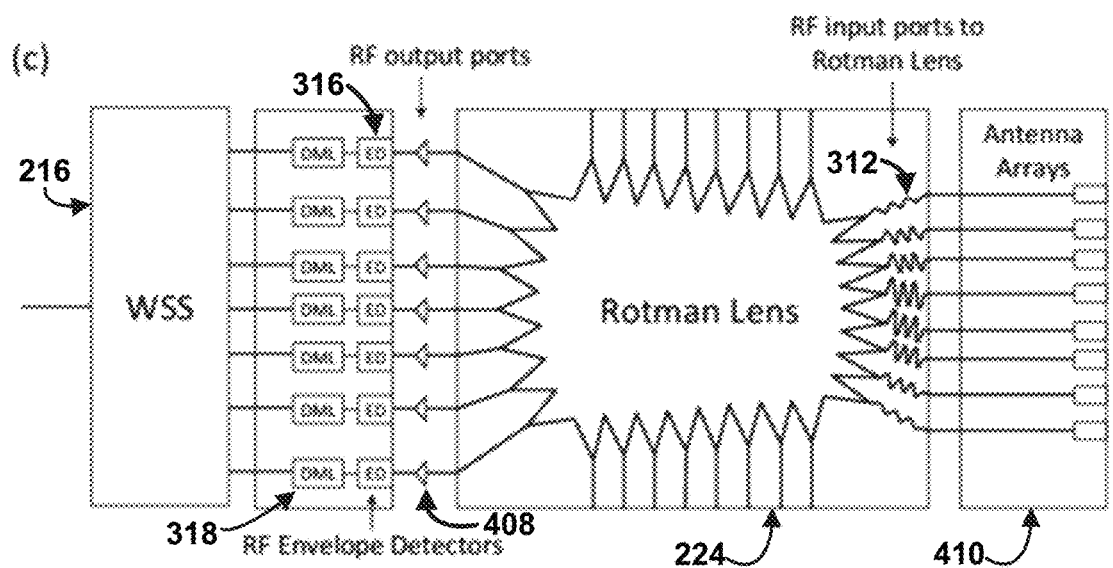
FIG. 4C shows one example optical-electrical antenna system for uplink data reception that includes envelope detectors and demodulated lasers, according to an embodiment.

FIG. 4C shows the uplink portion 219 for receiving electrical signals from user equipment, and then converting the electrical signals to optical signals for analysis by the optical signal source 102. Antenna elements of the antenna array 410 may receive MMW radio frequency (RF) signals with an appropriate array factor, and then send the electrical signal to electrical RF input ports 312 of the RL receiver 224. At the electrical RF output ports, after amplifications of the RF signals, by the array of amplifiers 408, a series of envelope detectors (EDs) 316 may detect the power of the RF electrical signals. After the EDs 316 have received the electrical signals, the electrical signals can be modulated onto the directly modulated laser (DML) 318 and then the outputted optical signals may be sent to the WSS 216 for transmission back to the optical signal source 102, through the fiber optic cable 214. In some embodiments, an I/Q mixer can also be used to down-convert complex signals from RF bands at an expense of increased number of optical transmitters.

Benefits of the envelope detectors 316 may be a broadband operating-frequency range and thus a lower cost. Moreover, in FIG. 4C, a requested bandwidth is expected to be smaller than the bandwidth in FIG. 4B, so that coherent detection may not be necessary. Aside from the DML 318, two other options can be used here. One is the combination of a distributed feedback (DFB) laser (not shown) plus Mach-Zehnder modulator (not shown) to provide larger bandwidth and less chirp. Another option is a vertical-cavity surface-emitting laser (VCSEL), which is an even cheaper option, with shorter transmission distance. It is also worth mentioning that through the proposed architecture, a bi-directional optical network, as shown in FIGS. 4A and B, to support the antenna system for transmitting and receiving the MMW signals simultaneously, can be achieved.

In FIG. 5A, by utilizing the reciprocal property of the optical device, the transmitting signals 502, from a WSS 501 to the RL transmitter 220, and receiving signals 504, from the RL receiver 224, to the WSS 501, may use different wavelength switching channels of the WSS 501 to duplex the transmitting and receiving signals 502, 504, respectively. In FIG. 5B, an optical circulator 506 may fully duplex optical signals using only single port of the WSS 501. Compared with the scheme in FIG. 5A, the optical circulator 506 may enable a full-duplex operation, reducing the number of ports of WSS 501, thus saving resources. However, the transmitting and receiving signals may use the same wavelength for each port of the WSS 501. Similarly, as shown in FIG. 5C, a transmitter/receiver switch 508 can be used, instead of the optical circulator 506, for directing transmitting and receiving signals from the WSS 501, to the RL transmitter 220, and, from the RL receiver 224, to the WSS 501, respectively. Thus, in FIGS. 5A and 5B, each output port of the WSS 501 may be shared by a downlink portion and an uplink portion via a switch (such as optical circulator 506 or optical transceiver switch 508. In embodiments including a MCS 406, the switch enabling port sharing of the WSS 501 may be located between the WSS 501 and the MCS 406.

Embodiments of the present disclosure can support multiple-beam generation at the same antenna array infrastructure (e.g., the antenna system 104, with reference to FIG. 1), as shown in FIG. 6A. The operation principle of multibeam coexistence is shown in FIG. 6A. The MMW signals ($RF_1$, $RF_2$, and $RF_3$) are each carried within the baseband signals 208 and corresponding local oscillator 207, and represented in FIG. 6B as corresponding carrier wavelengths ($\lambda_1$, $\lambda_2$, and $\lambda_3$). After optical-to-electrical conversion of each of the MMW signals, by the photo detectors 218, the MMW signals ($RF_1$, $RF_2$, and $RF_3$) will be routed to the corresponding electrical input ports of RL transmitter 220, thus radiating multiple MMW beams (i.e., Beam 1, Beam 2, and Beam 3) to various directions, by the antenna array 404. The directions of the MMW beams output by the array 404 will be dependent upon which input port of the RL transmitter 220 each of the MMW signals are routed to (by the WSS 216 and/or MCS 406). For example, the $RF_1$ signal associated with local oscillator $\lambda_1$, enters the top input port of the RL transmitter 220 and the outgoing Beam 1 is directed in a downward direction in the illustration on FIG. 6B. In other words, each input port of the RL transmitter 220 corresponds to a beam steering direction.

Compared with a traditional electrical switch, an insertion loss is greatly reduced when using wavelength division multiplexing instead of power splitters. The flexibility is also greatly enhanced that the multiple input MMW signals ($RF_1$, $RF_2$, and $RF_3$) on different bands can independently switch their input port to steer the radiation directions without conflicts to other MMW signals because multiple input MMW signals ($RF_1$, $RF_2$, and $RF_3$) can be multiplexed onto different wavelengths ($\lambda_1$, $\lambda_2$, and $\lambda_3$), and the WSS 216 can flexibly switch any combination of the MMW wavelengths ($RF_1$, $RF_2$, and $RF_3$) to any output port as shown in FIG. 5B. For example, the MCS 406 may be within the WSS 216, and any of the MMW signals ($RF_1$, $RF_2$, and $RF_3$) and carried by corresponding wavelengths ($\lambda_1$, $\lambda_2$, and $\lambda_3$) may be multiplexed and then broadcasted, by the MCS 406 to one or more input ports of the RL transmitter 220 (the optical to electrical conversion of the optical signals, by the photo detectors, is not shown). In this embodiment, the multiple MMW beam channels (i.e., Beam Channel_1, Beam Channel_2, . . . , Beam Channel_3) may be outputted in each of the directions, that only one Beam 1, Beam 2, or Beam 3 could project, as shown in FIG. 5A. For example, Beam Channel 1 would be outputted in the direction of each of the MMW beams (i.e., Beam 1, Beam 2, and Beam 3), shown in FIG. 5A. Similarly, Beam Channels 2 and 3 would be outputted in the direction of the multiple MMW signals ($RF_2$ and $RF_3$), as shown in FIG. 5B.

The modulation and selection of $\lambda_1$, $\lambda_2$, and $\lambda_3$ may be implemented by the wavelength selecting and modulating component 206 of the optical signal source. Thus, the wavelength selecting and modulating component 206 may include a processor that executes instructions to generate the necessary baseband 207 and local oscillator 208 pairs to carry the MMW signals. Each baseband 207 and local oscillator 208 pairs may be selected such that, when multiple baseband 207 and local oscillator 208 pairs are simultaneously broadcast by the WSS 216 and/or MCS 406 to the same photodetector 218, signal-to-signal beating interference is reduced or otherwise eliminated.

The steering angle of the RL transmitter 220 may not be continuously adjusted because the number of input ports to the RL transmitter 220 is limited to N input ports, as shown in FIG. 6B. So, only N discrete outgoing beam angles may be supported. During steering from a first beam to a second beam (e.g., from Beam Channel_1 to Beam Channel_2), the signal quality of the outgoing beam may suffer from some fluctuations if the power of the beam is too concentrated and has a narrow beam width. Thus, an array factor of the output antenna array may be carefully designed to guarantee a smooth signal transition during the switching between the two adjacent beamforming directions. It can be seen that after a photonics-MMW integration, the antenna-headend can be greatly simplified by utilizing fewer antenna elements and analog subsystems, because different users' signals can share the same set of antenna array. The size of the antenna elements may not scale proportionally with the number of beams. Moreover, since Rotman lens is a reciprocal device, a full-duplex operation to transmit and receive the wireless signals simultaneously is also possible.

Beam Control and Management for Proposed Antenna Systems

Figure 7A:
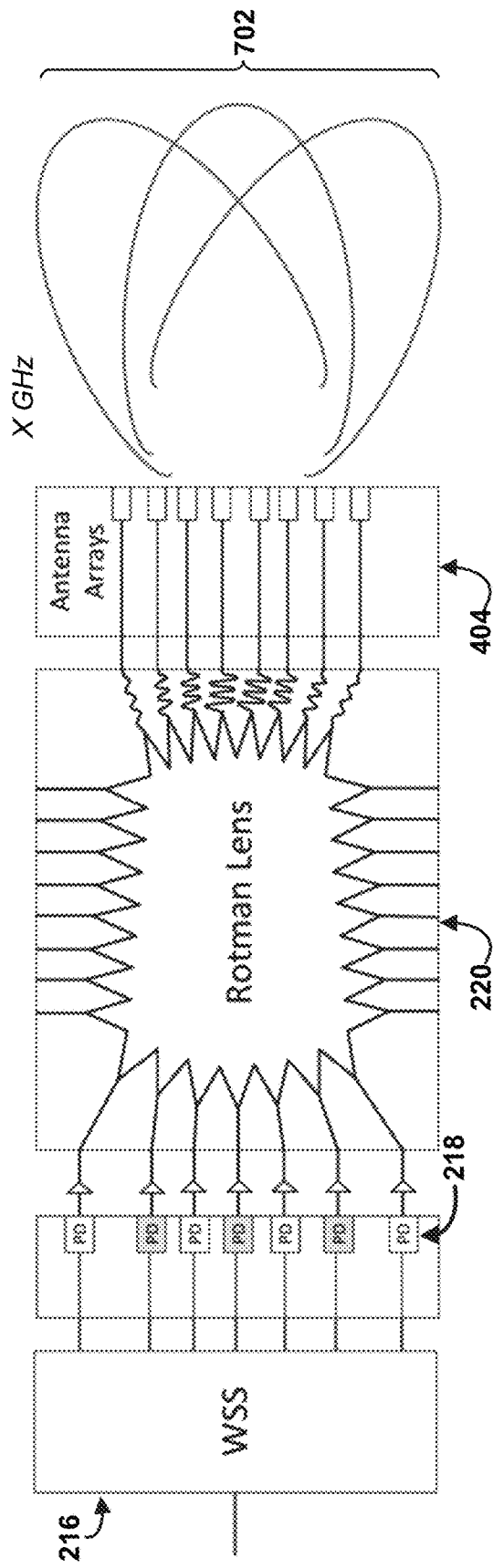
FIG. 7A shows an example antenna system for downlink transmission outputting 20 GHz beams from alternating antenna elements of an antenna array, according to an embodiment.
Figure 7B:
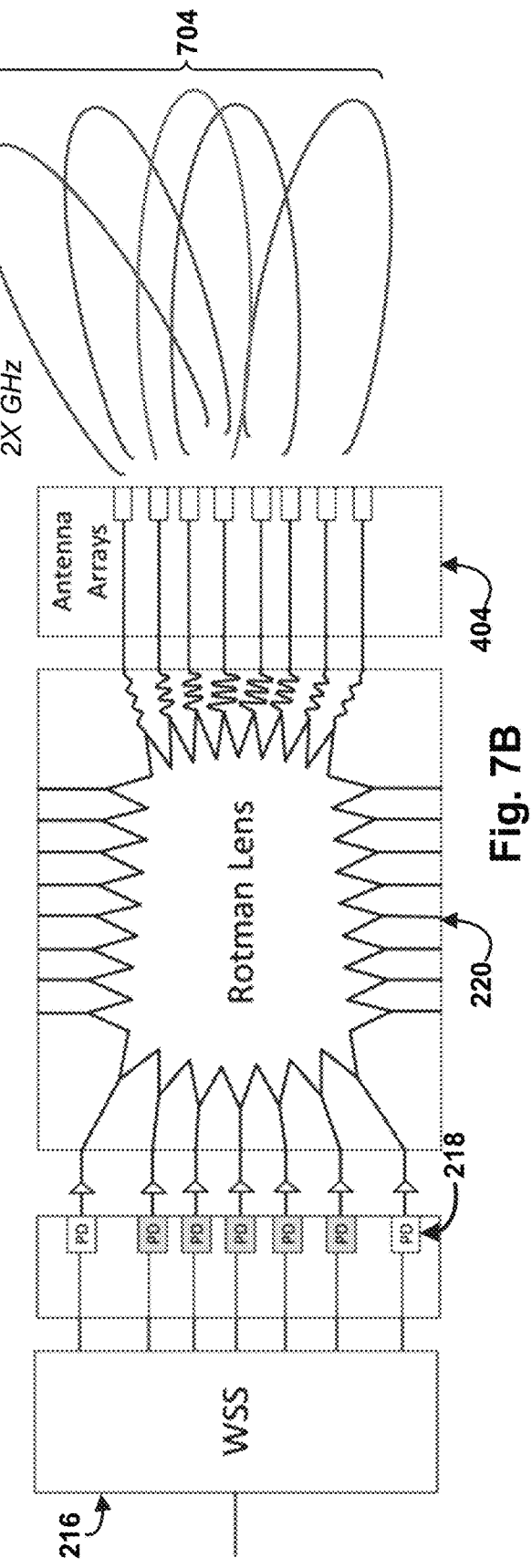
FIG. 7B shows an example antenna system for downlink transmission outputting 40 GHz beams from adjacent antenna elements of an antenna array, according to an embodiment.

A Rotman lens is capable of supporting a very large operating frequency range. However, the width of the outgoing beam may be determined by an array factor that is inversely proportional to the rate between the distance between adjacent antenna-elements and the wavelength of an outgoing beam. As shown in FIGS. 7A and B, given the same antenna array 404, an X-GHz radio frequency beam 702 (e.g., any GHz RF beam, such as a 20-GHz RF beam), as shown in FIG. 7A, the width of the outgoing RF beam 702 will be wider than that of 2X-GHz radio frequency beam 704 (e.g., a 40 GHz RF beam), as shown in FIG. 7B. This is because the outgoing beam will be based on the frequency of the incoming electrical signal when the distance between adjacent antenna elements is equal. Further, given the same angle separation of the outgoing RF beams 702, 704, the energy overlap of X-GHz beams 702 would be much larger than the 2X-GHz beams 704. Thus, by jointly considering the quality of service and cost in beam forming, under lower frequency, such as X GHz, the number of input optical channels (e.g., PDs 218) can be reduced, e.g., to only using the odd or even input optical channels (e.g., PDs 302 shaded in FIG. 7A), as shown in FIG. 7A.

However, the 2X-GHz RF beams 704 become significantly narrower, requiring the antenna system to increase the number of input optical channels (e.g., the PDs 218 shaded in FIG. 7B), as shown in FIG. 7B. In this case, both odd and even optical switching channels are activated (e.g., as shown by the five PDs 218 highlighted yellow). So, with the 2X-GHz RF beams 704, a higher density of beams may be implemented to mitigate the narrowed beam width of the 2X-GHz RF beams 704, improving coverage and reliability of the beam steering process. A Rotman lens-based beamformer may simultaneously emit out multiple beams on different MMW bands.

Figure 8A:
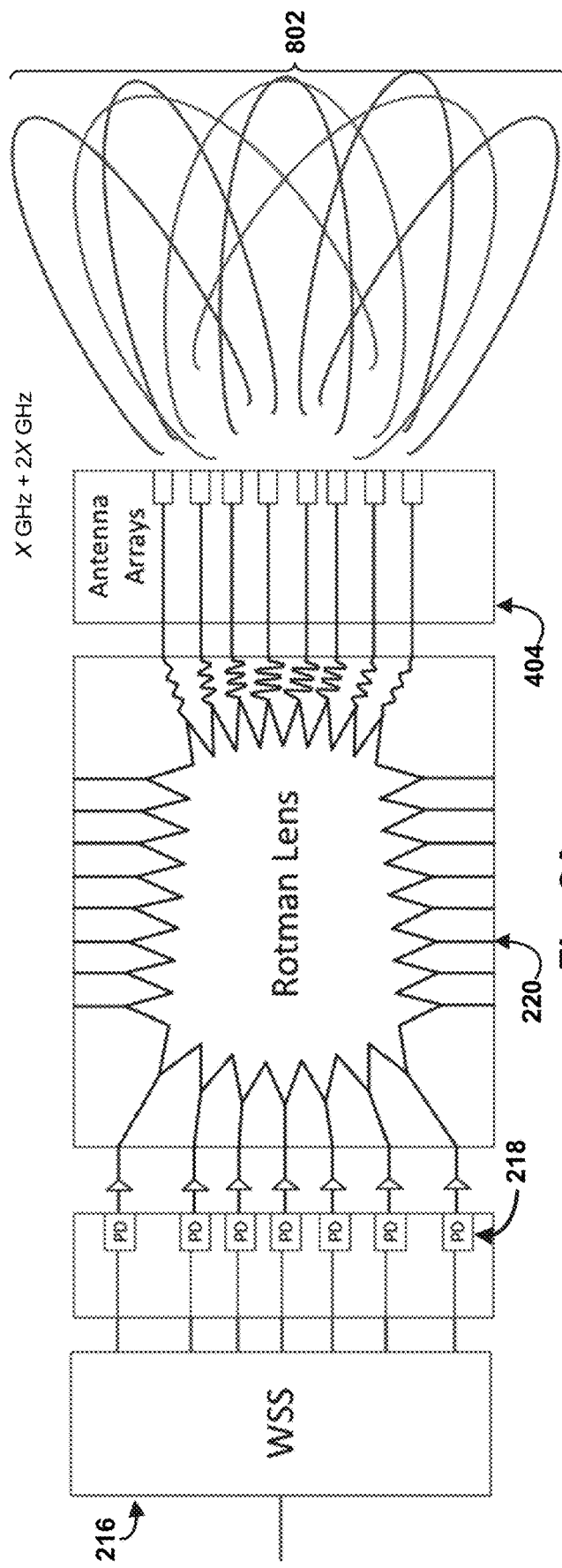
FIG. 8A shows an example antenna system for downlink transmission outputting both 20 GHz and 40 GHz beams from an antenna array, according to an embodiment.

As shown in FIG. 8A, the collective of two sets of beams 802, on X and 2X-GHz bands (e.g., where 20-GHz is X-GHz and 40-GHz is 2X-GHz), may be supported simultaneously using one antenna system (e.g., the antenna system 104, with reference to FIG. 1). Each beam of the two sets of beams 802, traversed through the WSS 216, as light, and were then converted, at the PDs 218, to electrical signals. Then, the two sets of beams may enter the RL transmitter 220, and then be outputted by the antenna array 404. In this embodiment, each of the two sets of beams 802 were outputted from each antenna element of the antenna array 404. In some embodiments, the two sets of beams 802 may have been outputted from any output of the one or more optical outputs of WSS 216 and then multiplexed, by the MCS (not shown), to each of the PDs 218. From there, the two sets of beams 802 may enter the RL transmitter, to be outputted by the antenna array 404. Each output port of the WSS 216 may support the two sets of beams 802.

Figure 8B:
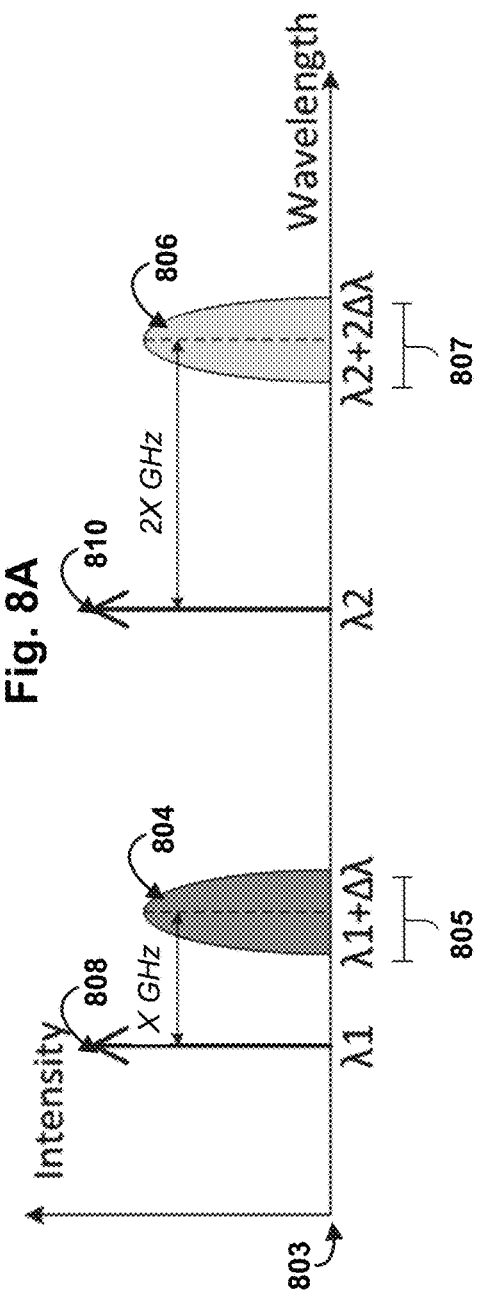
FIG. 8B shows a local oscillator and a corresponding baseband, for the 20 GHz beam and 40 GHz beams of FIG. 8A, represented on a graph showing the intensity of the frequency as a function of the wavelength frequency, according to an embodiment.

In FIG. 8B, each set of the two sets of beams 802, from Fig. A, is shown as a combination of a baseband 804, 806 and their corresponding local oscillator 808, 810, respectively. In the optical space (e.g., the wavelengths of local oscillator 207 and baseband signals 208), the wavelengths maybe in the terahertz or greater. To modulate to frequencies useable in the RF systems, the center frequency of the RF beams (e.g., beams 802) is defined by the distance between the local oscillator signal 207 and the center frequency of the corresponding baseband signal 208. The bandwidth of the RF beam is defined by the width of the baseband signal (e.g., the shaded portion in FIG. 8B). Thus, local oscillator 808 and bandwidth signal 804 are separated by X-GHz. The center frequency of the RF beam corresponding to those signals is X-GHz, at a channel bandwidth corresponding to the width 805 of the curve of baseband signal 804. Similarly, local oscillator 810 and bandwidth signal 806 are separated by 2X-GHz. The center frequency of the RF beam corresponding to those signals is 2X-GHz, at a channel bandwidth corresponding to the width 807 of the curve of baseband signal 806. The X and 2X-GHz MMW baseband signals 804, 806 (e.g., where X-GHz may be any GHz beam, such as 20-GHz, and 2X-GHz is a 40-GHz beam) are modulated onto the one-side band of $\lambda_1$ and $\lambda_2$, 808, 810, respectively. In this example, two wavelengths $\lambda_1$ and $\lambda_2$ are used because if multiple MMW signals are modulated onto a single wavelength, there will be a strong signal-to-signal beating interference after photo detection at the PDs (e.g., PDs 218), which may reduce the quality of the signal. Furthermore, the beam width (e.g., spatial width, not bandwidth) of the MMW beams 804, 806 can also be adjusted through switching the optical input signals on different wavelengths.

Figure 9:
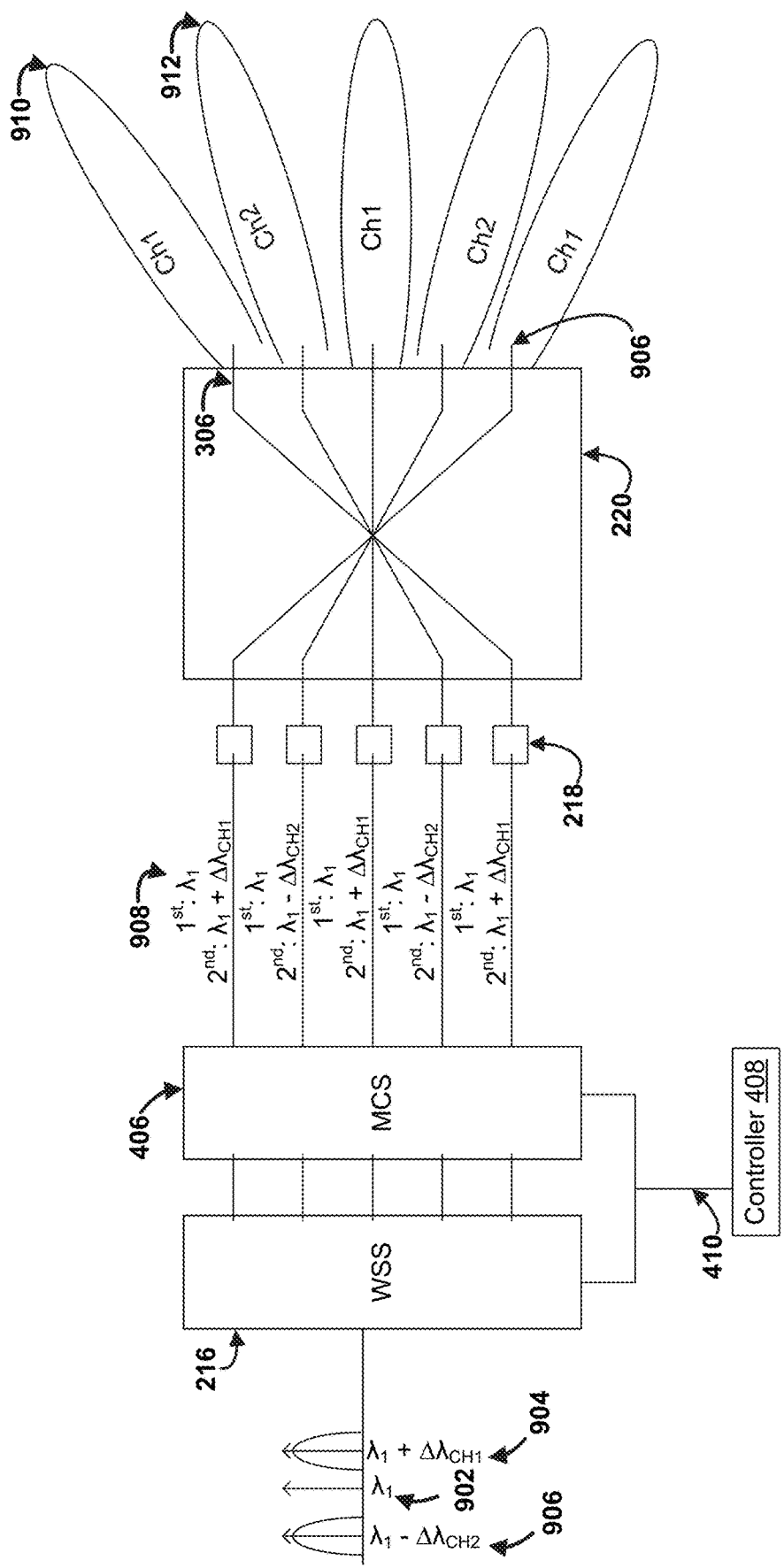
FIG. 9 shows how a local oscillator and two basebands, with different frequencies, inputted to an example antenna system, will be transmitted in two channel beams, on alternating antenna arrays, according to an embodiment.

In FIG. 9, an example antenna system (e.g., the antenna system 104) can be seen, according to an embodiment. In this embodiment, a single local oscillator signal $\lambda_1$ 902 is used to create two MMW channel signals 910 and 912. Each photodetector 218 receives a different pair of incoming light signals, where the first, third, and fifth photodetectors receive pair including local oscillator 902 and first baseband 904; and second and fourth photodetectors receive signal pair including local oscillator 902 and second baseband 906. FIG. 9 also shows the principle that the local oscillator 902 may be a wavelength that is greater than, or less than the baseband signal.

The WSS 216 may receive the optical signals 902, 904, and 906 and then transmit the optical signals 902, 904, and 906 to corresponding optical inputs of the MCS 406. The optical signals 902, 904, and 906 may be filtered and routed to the various optical inputs of the MCS 406 according to a final destination of user equipment (e.g., a desired beam channel and a desired beam steering direction). In FIG. 9, two channels are transmitted in alternating beams generated by the antenna array 906. Each channel 908 may include the same data (e.g., to communicate the same data to different devices operating on different channels), or may include different data (e.g., to communicate different data to different devices operating on different channels) depending on the modulation of the baseband signal associated with the given channel. The two channels 908 may be routed from the MCS 406 to a corresponding optical input of the PDS 218 such that alternating PDs 218 receive the optical signal pair associated with channel 1 and the remaining PDs 218 receive the optical signal pair associated with channel 2.

Then, the electrical signals, outputted by electrical outputs of the PDs 218, may enter an electrical input of the RL 220. The RL 220 may transmit the outgoing electrical signals to a corresponding antenna element 906 of an antenna array 306, which will output the channel 1 beams and the channel 2 beams in a particular beam direction that depends on the angle of the electrical signal entering the electrical inputs of the RL transmitter 220. The beam direction of the outgoing, two channels 910, 912 may steered to be directed to user equipment (not shown in FIG. 9) operating on the wireless communication architecture.

To maintain transmission to a moving external device (e.g., UE), a controller 408 may generate control signals 410 to control which of the photodetectors 218 receive which optical signal pair of local oscillators and baseband optical signals and thereby steer the beam such that a given MMW beam is "steered" to continue to be directed towards the moving device. The controller 408 may be housed within the antenna system 104 or within the optical signal source 102. The external device 106 may transmit location (e.g., GPS) and movement (e.g., direction, speed) data to the controller 408 (e.g., via the antenna system 104). The RF signals may include data corresponding to the location (e.g., GPS data) of the external device 106. The intelligent system may use this data to determine a direction of an outgoing, future beam(s) and, thus, which electrical input port of a transmitting Rotman lens the future, outgoing signal, destined for the external device 106, should enter.

Figure 10:
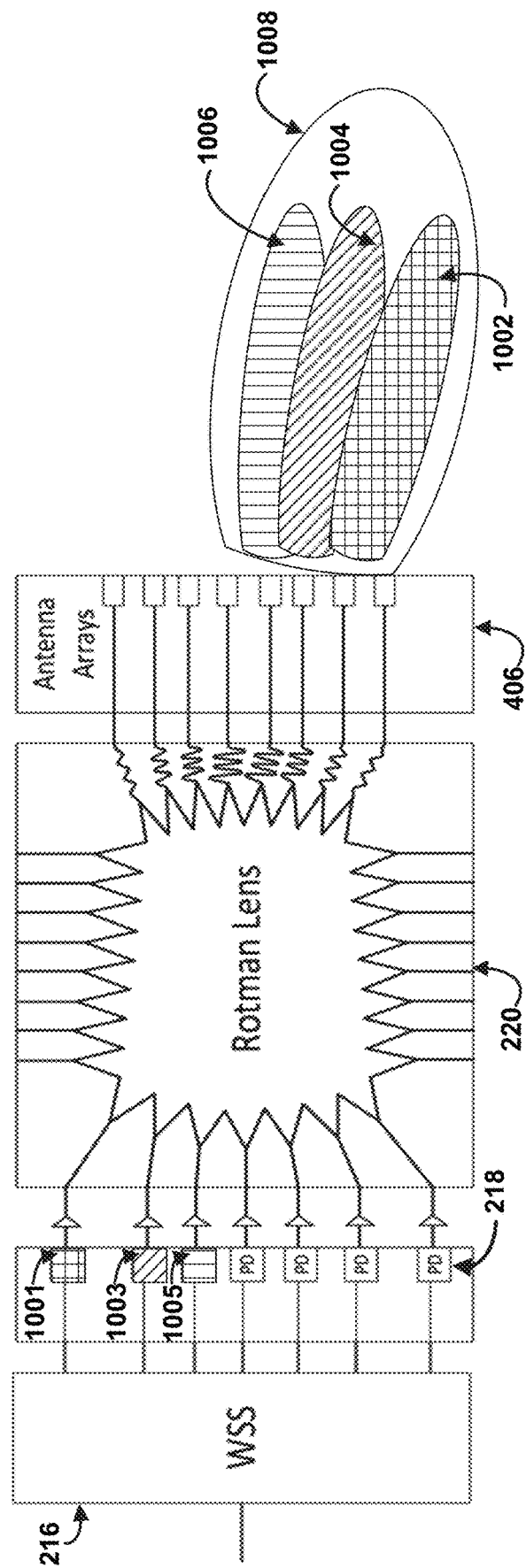
FIG. 10 shows a plurality of outgoing beams, from an antenna array, collectively forming a wider outgoing beam, according to an embodiment.

As shown in FIG. 10, when the PDs 218 (illustrated in cross-hatch, slanted-hatch, and vertical-hatch to show their corresponding outgoing beams 1002, 1004, 1006) receive a signal 1001, 1003, 1005, from the WSS 216, with a same MMW frequency carried by the incoming optical signal pair (e.g., each PD 218 is excited with the same pair of optical data), the narrow beams 1002-1006 will be formed at the antenna array 406, respectively. When the three wavelengths 1002, 1004, and 1006 are switched to the PDs 218 simultaneously, and are transmitted to the antenna array 406, by the RL transmitter 220, all the three beams 1002, 1004, and 1006 are generated, which synthesizes a wider collective MMW beam 1008. In general, the higher the number of wavelength beams 1002-1006 participating in the beam-forming, the wider the collective MMW beam 1008.

A Rotman lens is a two dimensional free-space MMW-device, so it can achieve flexible and accurate beam steering in the horizontal plane, but it may lack the capability to steer the beam in the vertical plane. Nevertheless, it is also worth noting that in most of the beam steering applications such as base station (e.g., antenna system 104, with reference to FIG. 1) to vehicle communication (e.g., 106(3), with reference to FIG. 1), on a highway, or smart devices (e.g., 106(1), with reference to FIG. 1), in a stadium, the change of angle in the vertical direction for a particular user equipment is less dynamic compared to the horizontal plane, and, in most cases, may be relatively fixed. Thus, to control the complexity and cost of directing the vertical beam, the mechanism to adjust the steering angle of the outgoing beams, in the vertical plane, can be simplified.

Figure 11:
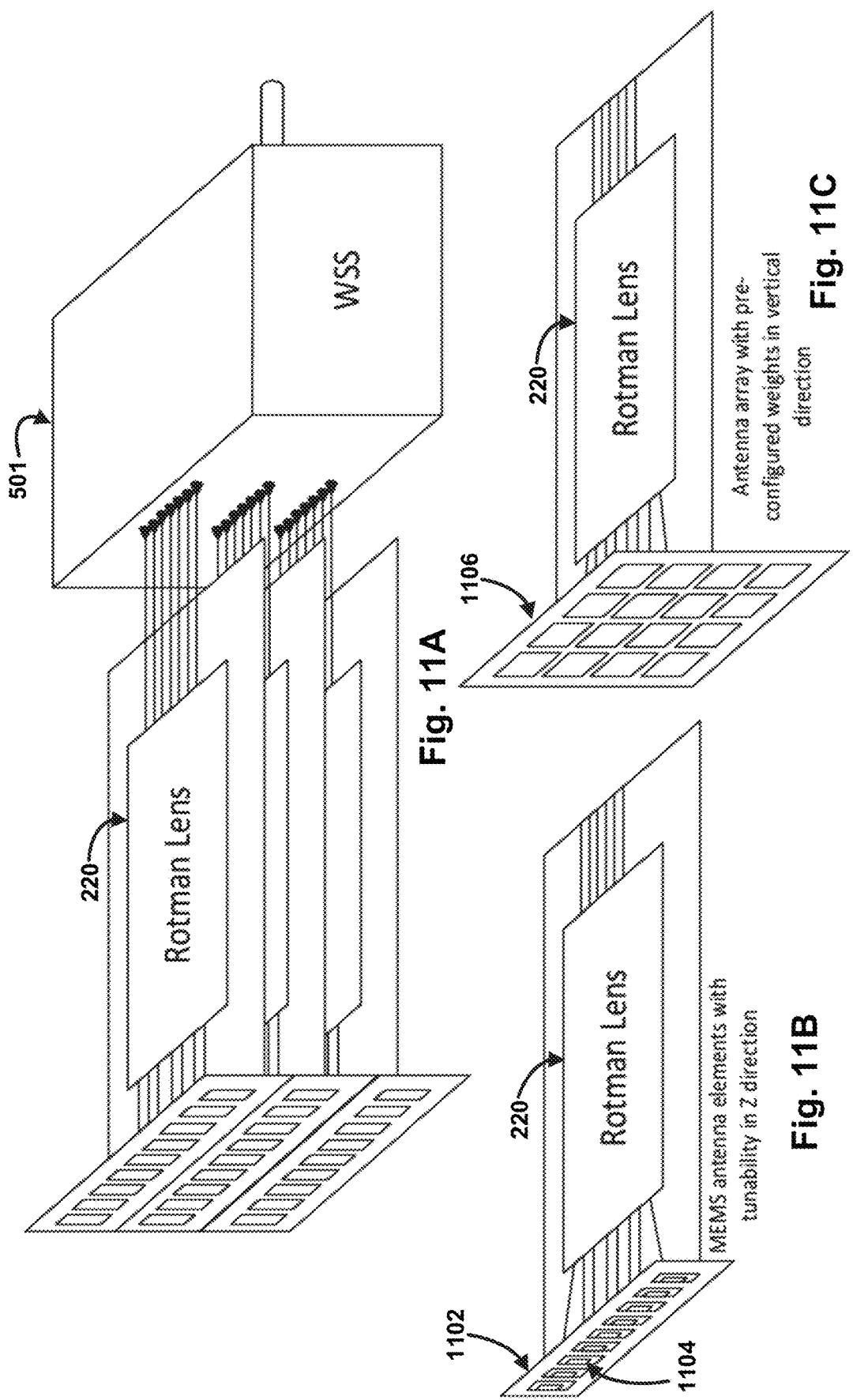
FIG. 11A shows an example two-dimensional antenna array, where each vertical row of the antenna array has a corresponding Rotman lens, according to an embodiment.
FIG. 11B shows an example micro-electro-mechanical system-based antenna array electrically connected with a single Rotman lens, according to an embodiment.
FIG. 11C shows an example two-dimensional antenna array connected with a single Rotman lens, according to an embodiment.

In some embodiments, staggering multiple layers of transmitter 220 and receiver 224 could be an option to achieve the best beam-steering performance in the vertical direction, as shown in FIG. 11A. To steer in the vertical direction in FIG. 11A, input to each Rotman lens 220 is configured to control steering in the horizontal direction. Further, the inputs across multiple Rotman lenses 220 are coordinated to control steering in the vertical direction (e.g., the top, middle, and bottom Rotman Lenses 220 are excited at coordinated times to control the output vertical direction from the array. However, the structure in FIG. 11A faces issues of increased complexity and cost because of the multiple Rotman lens 220 stacking required for each antenna array in the vertical direction and the corresponding WSS 501 (with reference to FIG. 5A-C) configuration for each stacked Rotman lens 220. In FIG. 11A, a WSS 501 can be used to allocate wavelengths to the electrical input ports of the Rotman lens 220 and program the phase of each channel. In an embodiment, the multi-layer Rotman lens 220 can also be replaced by a three-dimensional Rotman lens instead. A three-dimensional Rotman lens may have the same physical characteristics of a two-dimensional Rotman Lens, e.g., the incoming beam direction is the same as the outgoing beam direction. For example, the incoming beam may be directed at a 30-degree angle above ground, the outgoing beam will have approximately the same 30-degree beam angle.

In FIGS. 11B and C, two embodiments for simplifying beam steering in the vertical plane are shown. In FIG. 11B, a one-dimensional antenna array is shown but each antenna element 1104 of the antenna array 1102 may be a micro-electro-mechanical system (MEMS) based antenna pad. A MEMS antenna may be a very cost-effective solution to work together with Rotman lens to provide a limited beam steering tunability in the vertical direction. In FIG. 11C, a two-dimensional antenna array 1106 can be seen, and each column of the antenna array 1106 elements may have pre-configured amplitudes and phases, that may be fixed to cover a certain range of angles in the vertical plane, e.g., 30-60 degrees, etc. The steering angle in the horizontal plane may be controlled by a Rotman lens-based system 220.

To reduce transmission delay, from the optical signal source 102, through the antenna system 104, to user equipment 106(1)-(3) (with reference to FIG. 1), antenna systems 104 may include intelligent features that may re-configure the wavelength channels at the WSS 216 (and MCS 406, if included) to switch optical data streams to different beams and control the direction of the outgoing beams. A Rotman lens could support multi-beam coexistence without interference such that the outgoing beam from an antenna array so that no adjacent beam is operating on the same channel (e.g., the channels 1 and 2, with reference to FIG. 9). Thus, an independent probe signal could be sent to every input port of a Rotman lens subsequently to sweep over all the possible directions for mobile user detection. Position information could also be obtained by decoding the upstream signals received from the user equipment to identify positioning and destination information for the user equipment. Such information may be used to reconfigure the antenna system or the optical light to steer an outgoing beam to a correct angle to reach destined user equipment.

Figure 12:
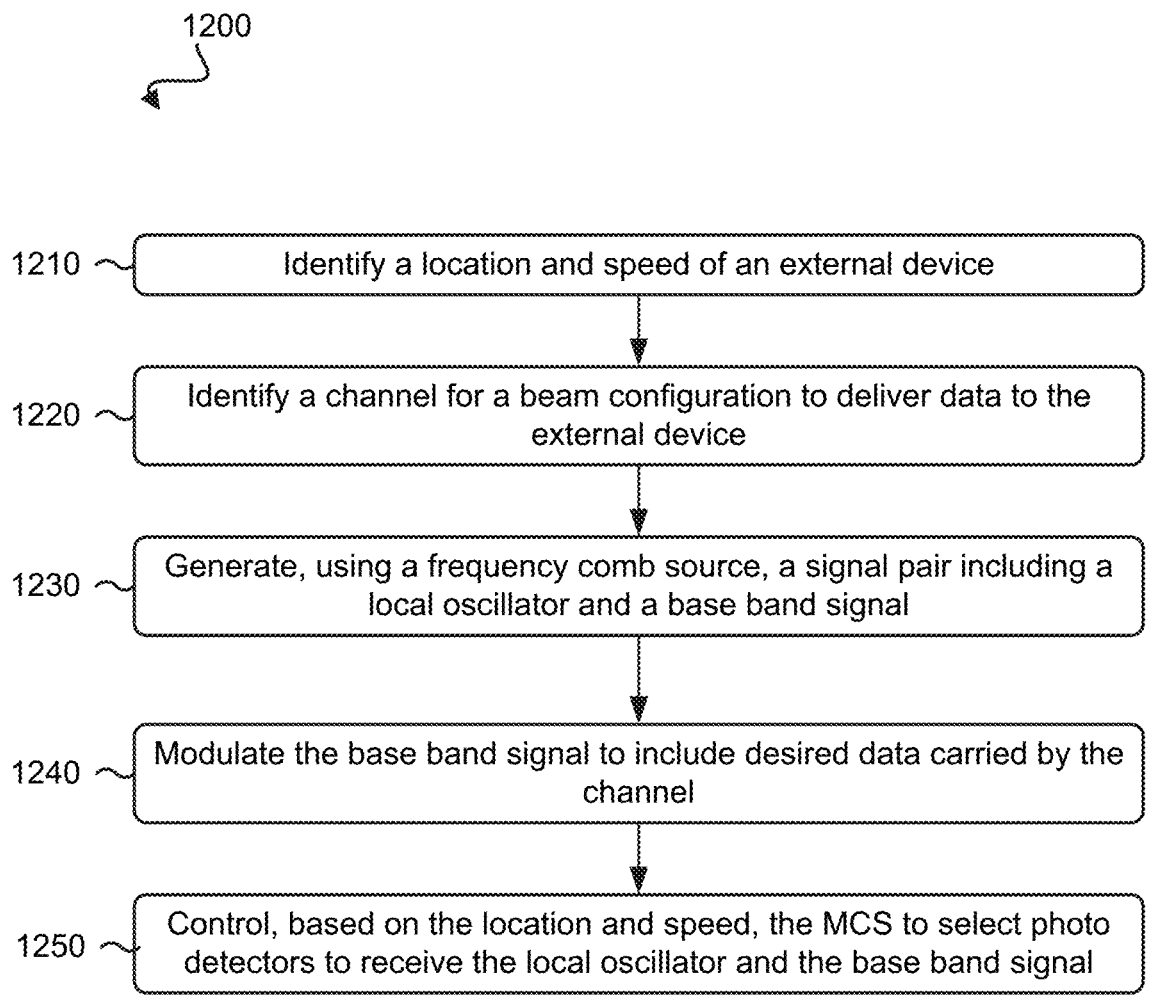
FIG. 12 shows an example process for generating a beam destined for an external device based on identifying a location and speed of the external device, according to an embodiment.

FIG. 12 is a flowchart of an example process 1200 associated with determining an outgoing beam based on a location and speed of an external device. As shown in FIG. 12, process 1200 may include identifying a location and speed of an external device (block 1210). In some embodiments, the external device may transmit location (e.g., GPS) and movement (e.g., direction, speed) data to the controller (e.g., the controller 104; via the antenna system), which corresponds to the location (e.g., GPS data) of the external device. An intelligent system (e.g., the controller) may use this data to determine a direction of an outgoing, future beam(s) and, thus, which electrical input port of a transmitting Rotman lens the future, outgoing signal, destined for the external device, should enter.

In some embodiments, the external device may be a smart car, a mobile device (e.g., a smart phone), etc. In some embodiments, the antenna system (e.g., the antenna system 104, with reference to FIG. 1) may identify a location and speed of an external device by scanning a within a perimeter of the antenna system to identify any external devices within the area, e.g., in response to instructions from the controller. In some embodiments, the external device may transmit a signal to the antenna system that includes the location and speed of the external device. The location may be the current location of the external device or a location at a future time, and the speed may be the current speed of the external device. The location and speed of the device may convey where and when the external device may be located at a future time. In some embodiments, GPS data or other identifying data of the external device may be identified along with the location and speed.

As further shown in FIG. 12, process 1200 may include identifying a channel for a beam configuration to deliver data to the external device (block 1220). For example, the device may identify a channel for a beam configuration to deliver data to the external device, as described above. The channel may be a channel that the external device may accept. In some embodiments, the controller (e.g., the controller 408, with reference to FIGS. 4A, B) may determine, based on the location data and the speed of the external device, what channel to use to deliver the data to the external device in an efficient way so that, e.g., there is minimal data leakage. As further shown in FIG. 12, process 1200 may include generating, using a frequency comb, a signal pair including a local oscillator and a base band signal (block 1230). In some embodiments, the controller may determine which signal pair to use based on the frequency of the local oscillator and the frequency of the base band signal.

As further shown in FIG. 12, process 1200 may include modulating the base band signal to include desired data carried by the channel (block 1240). For example, the desired data may include the data corresponding to control an outgoing beam directed to the external device. For example, the desired data may include which of the photodetectors (e.g., photo detectors 218) receive which optical signal pair of local oscillators and baseband optical signals and thereby steer the beam such that a given MMW beam is "steered" to continue to be directed towards the moving device. As further shown in FIG. 12, process 1200 may include controlling, based on the location and speed, the MCS to select photo detectors to receive the local oscillator and the base band signal (block 1250). For example, the location and speed of the external may be such that a particular photo detector must be selected so that the outgoing MMW beam from the Rotman lens is "steered" in the direction of the external device.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A radio-frequency beam-transmission component having optical inputs and electrical outputs, comprising:
   a wavelength selective switch (WSS) having:
      a plurality of optical WSS outputs each configured to transmit one or more wavelengths of an incoming optical signal from an optical signal source; and
      a plurality of photodetectors (PD), each photodetector having:
         an optical PD input directly coupled to one or more of said plurality of optical WSS outputs, and
         a corresponding electrical output of a plurality of PD electrical outputs;
   a lens, having:
      a plurality of electrical inputs each electrically coupled to at least one of the plurality of PD electrical outputs, and
      a plurality of electrical lens output ports; and
   an optical multi-cast switch (MCS).

2. The radio-frequency beam-transmission component of claim 1, wherein the optical signal source comprises a wavelength selector and modulator having (a) an optical input coupled to an output of an optical source and (b) an optical output coupled to the WSS.

3. The radio-frequency beam-transmission component of claim 1, wherein the optical signal source comprises an optical frequency comb.

4. The radio-frequency beam-transmission component of claim 1, wherein the optical signal source comprises a wavelength selector and demodulator having an optical input coupled to an output of the optical signal source.

5. The radio-frequency beam-transmission component of claim 1, the optical MCS having a plurality of optical MCS inputs optically coupled to the plurality of optical WSS outputs.

6. The radio-frequency beam-transmission component of claim 5, the optical MCS having a plurality of optical MCS outputs, each optical MCS output coupled to one or more optical PD input.

7. The radio-frequency beam-transmission component of claim 6, wherein an optical signal received at one of the optical MCS inputs is transmitted on a respective one or more of the plurality of optical MCS outputs.

8. The radio-frequency beam-transmission component of claim 6, wherein an optical signal received at one of the plurality of optical MCS inputs is broadcast on a respective two or more of the plurality of optical MCS outputs.

9. The radio-frequency beam-transmission component of claim 1, wherein the optical MCS is housed within the WSS.

10. The radio-frequency beam-transmission component of claim 1, wherein the lens is a 3D Rotman lens that is configured to steer electrical signals in a vertical direction from the plurality of electrical lens output ports.

11. The radio-frequency beam-transmission component of claim 1, wherein the incoming optical signal includes a plurality of signal pairs each including a baseband signal and a local oscillator signal.

12. The radio-frequency beam-transmission component of claim 11, each signal pair, after detection by one of the plurality of PDs, defines an RF signal that is output by an antenna array coupled to one of the electrical lens output ports.

13. The radio-frequency beam-transmission component of claim 1, wherein the lens is a millimeter wave lens.

14. The radio-frequency beam-transmission component of claim 13, wherein the lens is a Rotman lens.

15. The radio-frequency beam-transmission component of claim 1, wherein the WSS simultaneously transmits at least two signal pairs to a set of the plurality of PDs, and, in response to the at least two signal pairs, an antenna array coupled to one of the electrical lens output ports generates at least two RF signals corresponding to the at least two signal pairs.

16. The radio-frequency beam-transmission component of claim 15, the at least two signal pairs being spectrally separated to account for signal-to-signal beating at the photodetector.

17. An antenna, comprising:
- an antenna array having a plurality of antennae each configured to receive one or more wavelengths of electrical signals from user equipment;
- a lens, having:
    - a plurality of electrical inputs each electrically coupled to at least one of the plurality of antennae; and
    - a plurality of electrical lens output ports;
- an envelope detector (ED), having:
    - a plurality of ED input ports each coupled to a corresponding electrical lens output port of the plurality of electrical lens output ports; and
    - a plurality of ED output ports;
- a demodulated laser (DML), having:
    - a plurality of electrical DML inputs each electrically coupled to a corresponding one of the plurality of ED output ports; and
    - a plurality of optical DML outputs; and
- a wavelength selective switch (WSS), having a plurality of optical WSS inputs each electrically coupled to a corresponding optical DML output of the plurality of optical DML outputs.

18. The antenna of claim 17, the WSS further comprising an optical WSS output optically coupled to an optical switch of an optical signal source.

19. The antenna of claim 17, further comprising an array of amplifiers located between each ED input port of the plurality of ED input ports and each electrical lens output port of the plurality of electrical lens output ports.

* * * * *